March 20, 1951     O. W. FISHER, SR     2,545,772
ANT TRAP

Filed Sept. 1, 1949

Inventor

Oliver W. Fisher, Sr.

By *Clarence A. O'Brien and Harvey B. Jacobson*

Attorneys

Patented Mar. 20, 1951

2,545,772

UNITED STATES PATENT OFFICE 2,545,772

ANT TRAP

Oliver W. Fisher, Sr., Baton Rouge, La., assignor of one-half to Oliver W. Fisher, Jr., Baton Rouge, La.

Application September 1, 1949, Serial No. 113,579

5 Claims. (Cl. 43—121)

This invention relates to an ant trap of novel construction and has for its primary object to provide a trap which is relatively simple in design and construction, easy to assemble, and cheap to manufacture in large quantities.

A further object of this invention is to provide an ant trap which does not employ an insecticide or ant poison directly. As a result, some ants will reach the bait, go back to the colony, and lure the colony to the trap. The oncoming ants will meet the ants on the food or bait side of the trap causing the ants to crowd upon a pair of pins, and as a result the ants will drop onto a third pin which will in turn sag and dump the ants into a jar. An insecticide may be used after the ants have collected in the jar to eradicate them. The jar is further provided with an annular channel in which oil is placed to prevent escape of the live ants from the jar.

A further object of this invention is to provide an ant trap comprising a base, a post carried by said base, a jar supported on said base, an oil retaining annular channel at the upper open end of said jar, a bait retaining container, means for removably retaining said container on said jar, a first pin adjustably carried by said post, a second pin, means for adjustably retaining said second pin on said container adjacent said first pin, a third pin, and means for resiliently supporting said third pin on said post.

These, together with various ancillary objects and features of the invention which will later become apparent as the following description proceeds, are attained by the device, a preferred embodiment of which has been illustrated by way of example only in the accompanying drawings, wherein.

Specific reference will now be made to the drawings. In the several views in the accompanying drawings and in the following specification reference characters indicate corresponding elements throughout.

Figure 1:
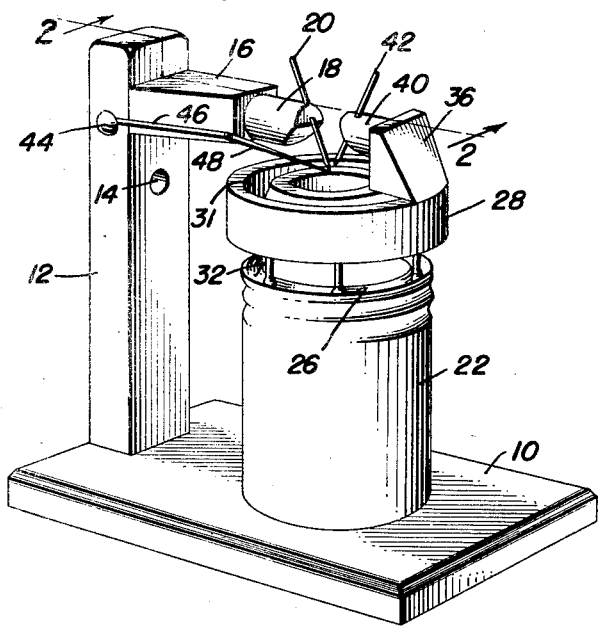
Figure 1 is a perspective view of the assembled ant trap.
Figure 3:
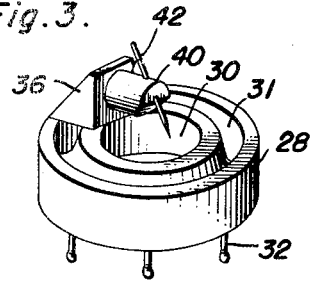
Figure 3 is a perspective view of the bait or food container.
Figure 4:
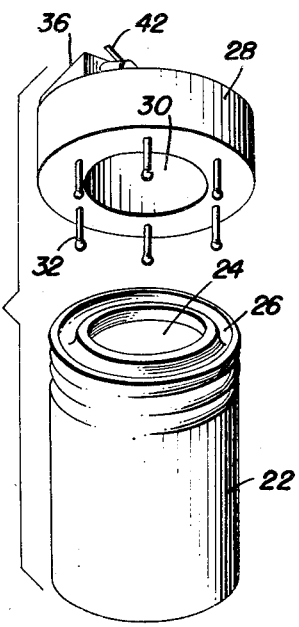
Figure 4 is a group assembly view in perspective of the bait container and the insecticide jar.
Figure 2:
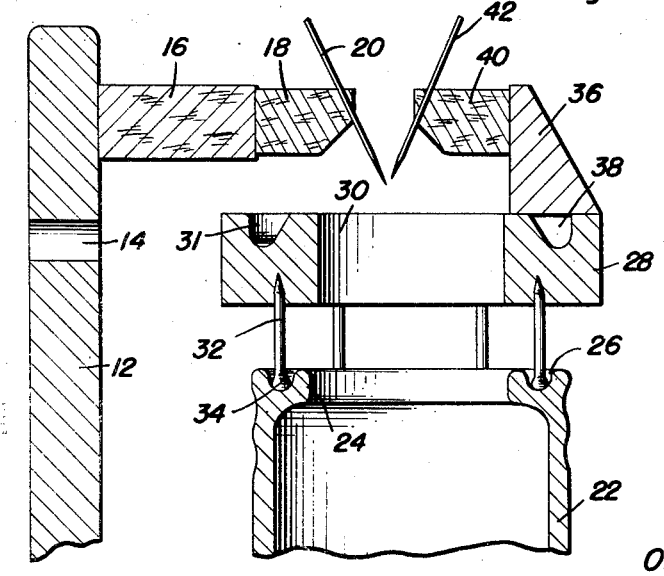
Figure 2 is a sectional view taken substantially on the plane of section line 2—2 of Figure 1.

Indicated generally at 10 is a base, fabricated of suitable wood, plastic or metal, to which is secured a post 12 at one end having an aperture 14 for receiving a pin (not shown) for suspending the post and base on a wall. Secured to the upper end of the post 12 is a block 16 which carries a cork 18 through which extends a first pin 20, it being understood that the pin 20 is adjustable in the cork 18.

Supported on the base 10 is a substantially cylindrical jar 22 which is open at its top end as at 24. At its open upper end the jar 22 is provided with an annular groove or channel 26 which will also retain a suitable oil for preventing the live ants from escaping from the jar.

A food or bait container 28 is provided, which is preferably cylindrical in shape and which contains a central aperture 30 which is communicated with the interior of the jar 22. Depending from the bottom of the bait container 28 is a plurality of prongs 32 having rounded ends 34 which are received in the channel or groove 26 so that the bait container 28 is supported on the jar in spaced relationship thereto and may be rotated relative to the jar 22. The upper edge of the container 28 is provided with an annular groove 31 for retaining ant bait or food of any desired kind, such as sweetened water.

A block 36 is provided having a depending lug 38 which is received in the annular groove 31 and as a consequence thereof may be adjustably positioned upon the bait container 28. The block 36 is further provided with a horizontally extending cork 40 for removably and adjustably receiving a second pin 42 which cooperates with the first pin 20 to form a V-configuration with a space at the apex thereof.

Secured as at 44 to the post 12 adjacent the block 16 is a leaf spring 46 the free end of which is formed with a third pin 48 which normally extends to a point adjacent the bottom ends of the first and second pins 20 and 42. As will be seen clearly in Figure 1, all of the pins overlie the central opening 30 of the bait container 28.

In practical operation, the ants being attracted to the bait in the annular groove 31 will climb on the device in an attempt to reach the bait. If the ants go up the sides of the jar 22 they will be unable to bridge the gap between the bait container 28 and the upper edge of the jar 22 and will fall into the oil in the annular channel 26. After a while, the ants will learn that they cannot reach the bait by going up the jar 22 and consequently will go up the post 12 and down the first pin 20. If the ants are able to bridge the gap between the pointed ends of the first and second pins 20 and 42 they will reach the food in the annular groove 31.

As a result, the ants will go back and lure the colony to the trap. The oncoming ants will meet the ants on the food side of the trap causing crowding on the pins 20 and 42, and as a result the ants will drop on the pin 48 which will, in turn, sag and drop the ants into the jar 22. The oil in the annular channel 26 will prevent escape of the live ants from the jar and an insecticide may later be employed to eradicate the ants in the jar.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. An ant trap comprising a base, a post carried by said base, a jar having an open upper end and supported on said base, an oil retaining annular channel at the upper open end of said jar, a bait retaining container provided with a central aperture above and communicative with the open upper end of said jar, means for removably retaining said container on said jar, a first pin adjustably carried by said post, a second pin, means for adjustably retaining said second pin on said container adjacent said first pin, a third pin, and means for resiliently supporting said third pin on said post beneath said first and second pins, all of said pins constituting runways for ants and terminating immediately above said central aperture provided in said bait container.

2. The combination of claim 1, wherein said bait retaining container is provided with an annular groove about said central aperture for receiving the bait.

3. The combination of claim 2, wherein said first-named means includes spaced prongs depending from said container and received in said annular channel.

4. The combination of claim 3, wherein said means for adjustably retaining said second pin includes a block having a depending lug received in said annular groove and a cork extension for removably receiving said second pin.

5. The combination of claim 4, wherein said means for resiliently supporting said third pin includes a spring secured to said post adjacent said first pin, said third pin being formed at the free end of said spring.

OLIVER W. FISHER, Sr.

REFERENCES CITED

The following references are of record in the file of this patent:

UNITED STATES PATENTS

| Number | Name | Date |
|---|---|---|
| 1,822,307 | Nettekoven | Sept. 8, 1931 |
| 2,051,800 | Lindecker | Aug. 18, 1936 |
| 2,168,339 | Himel | Aug. 8, 1939 |

FOREIGN PATENTS

| Number | Country | Date |
|---|---|---|
| 318,188 | Germany | Mar. 25, 1919 |